June 8, 1965 R. A. GROUT 3,188,038
SUPPORT STRUCTURE
Filed July 15, 1963

INVENTOR.
RUSSELL ALLEN GROUT
BY William R. Jacox
ATTORNEY

3,188,038
SUPPORT STRUCTURE
Russell Allen Grout, Norwood, Mass., assignor to Standard-Thomson Corporation, Waltham, Mass., a corporation of Delaware
Filed July 15, 1963, Ser. No. 294,982
11 Claims. (Cl. 248—223)

This invention relates to support structure. The invention relates more particularly to support structure and attachment means therefor.

The invention relates still more particularly to support structure for a mirror or other device and attachment means for the securing thereof to a surface or element of a portion of an automobile or the like.

An object of this invention is to provide support structure and attachment means therefor.

Another object of this invention is to provide support structure and attachment means therefor in which the attachment means is substantially obscure so that the support structure may present a good external appearance.

Another object of this invention is to provide such support structure and attachment means therefor which can be easily and readily assembled and attached to a surface or element.

Another object of this invention is to provide such support structure and attachment means therefor which can be produced at relatively low cost and which is long-lived.

Other objects and advantages reside in the construction of parts, the combination thereof, the method of manufacture, and the mode of operation, as will become more apparent from the following description.

In the drawing:

FIGURE 3 is a side sectional view, drawn on the same scale as FIGURE 2, showing the support structure and attachment means secured to a surface or element or the like.

Figure 1:
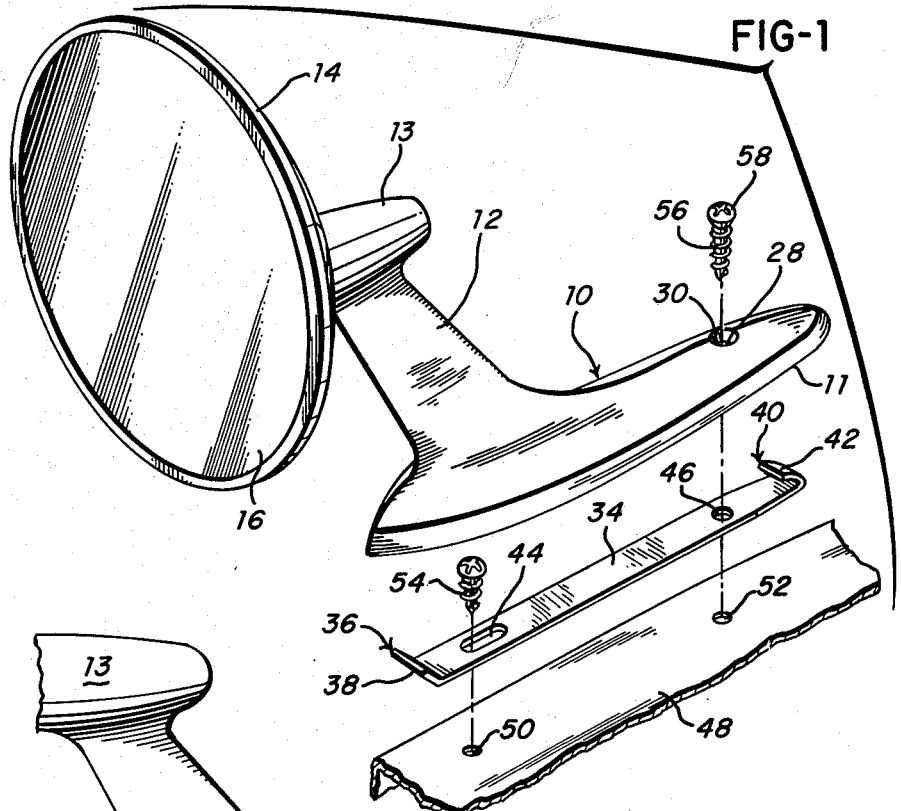
FIGURE 1 is an exploded perspective view of support structure and attachment means therefor. This view also shows a mirror carried by the support structure and a surface or element to which the support structure is attached.

Referring to the drawing in detail, support structure of this invention is shown in the form of a base member 10. The base 10 has a lower edge 11 which is adapted to engage a support surface or an element or the like. The base 10 is shown as having a stem 12 attached thereto. The stem 12 may be attached to the base 10 in any suitable manner, such as integrally or the like.

Herein the stem 12 is shown as having a connection portion 13 which has a mirror housing 14 carried thereby in any suitable manner. The mirror housing 14 carries a mirror 16.

It is to be understood, however, that the base member 10 may have any one of many types of elements or devices attached thereto for support thereby.

Figure 2:
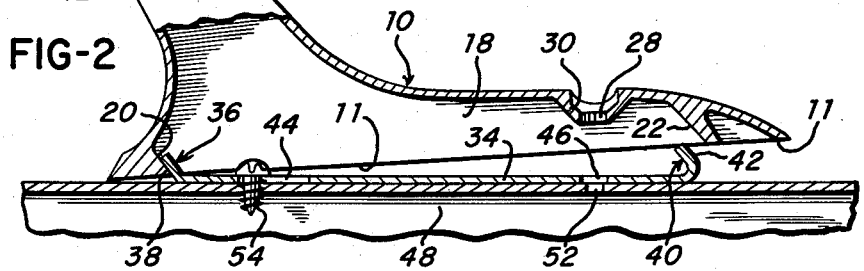
FIGURE 2 is a side sectional view, with parts shown in elevation, of support structure and attachment means in positions of assembly and attachment thereof.
Figure 3:
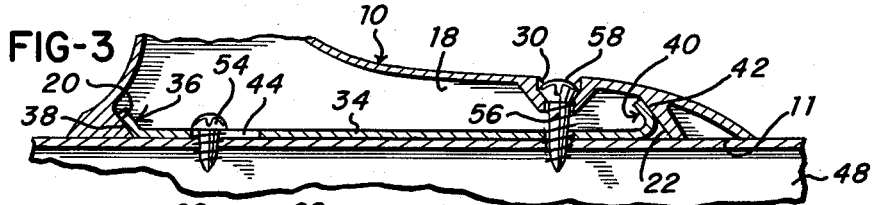

As shown in FIGURES 2 and 3, the base member 10 has a cavity 18 therein. The cavity 18 has an opening at the lower edge 11 of the base 10. Within the cavity 18 and adjacent the lower edge 11 is an inclined wall surface 20 which slopes toward the lower edge 11 while also sloping toward the central portion of the base 10.

At the opposite portion of the cavity 18 is an inclined wall surface 22 which slopes away from the central portion of the cavity 18 while also sloping toward the lower edge 11.

The wall surfaces 20 and 22 are shown as being substantially parallel one with respect to the other, but such parallel relationship is not necessary so long as the surfaces 20 and 22 extend in substantially the same general direction with respect to the edge 11.

The base member 10 has a screw hole 28 leading to the cavity 18. A recessed portion 30 is shown encompassing the hole 28.

Attachment means in the form of a plate or bracket 34 has an engagement portion 36 at one end thereof. The engagement portion 36 has an inclined engagement surface 38. The plate 34 also has an engagement portion 40. The engagement portion 40 is provided with an engagement surface 42.

Preferably, a part of the engagement portion 36 and/or a part of the engagement portion 40 is slightly resiliently movable with respect to the other portions of the plate 34.

The plate or bracket 34 has a plurality of spaced apart holes therethrough, there being a hole 44 which may be elongate, as shown. The plate 34 also has a hole 46.

The plate 34 is adapted to be attached to any suitable surface or element. Herein a surface or element 48 is shown as being provided with a hole 50 and a hole 52. The holes 44 and 46 of the plate 34 are adapted to be aligned with the holes 50 and 52, respectively of the surface 48. The elongate hole 44 in the plate 34 permits such alignment of the respective holes without the necessity of precise spacing of the holes 50 and 52.

A screw 54 extends through the hole 44 of the plate 34 and is threadedly secured within the hole 50 for attachment of the plate 34 to the surface 48.

Then, the base 10 is placed over the bracket or plate 34, as shown in FIGURE 2. The left hand portion of the base 10, as shown in FIGURE 2, is "hooked over" the engagement portion 36 of the bracket 34 as the inclined wall 20 within the cavity 18 is placed into engagement with the engagement surface 38 of the engagement portion 36. During this procedure the base 10 is slightly inclined with respect to the plate 34, as shown in FIGURE 2, with the right hand portion of the base 10 spaced slightly from the plate 34. Then the right hand portion of the base 10 is moved closer to the plate 34, and the inclined wall surface 22 comes into contact with the engagement surface 42.

Then a screw 56, having a head 58, is inserted through the hole 28 of the base 10 and through the hole 46 of the plate 34, and the screw 56 is threaded into the hole 52 of the surface 48. As the screw 56 is threaded into the hole 52, the inclined wall surface 22 is forced with increasing pressure against the engagement surface 42 of the plate 34. Cam action of the inclined wall surface with respect to the engagement surface 42 as the base is drawn closer to the bracket 34 causes the base 10 to be urged toward the right. Due to the fact that the inclined engagement surface 38 serves as an abutment to limit movement of the base 10 toward the right, the force between the inclined wall 20 and the engagement surface 38 increases as the pressure of the inclined wall surface 22 against the engagement surface 42 increases. The slightly resiliency of the upper part of either one or both of the engagement portions 38 or 40 permits slight movement thereof toward the opposite engagement portion as the inclined wall surface 22 is forced upon the engagement portion 40.

Thus, the base 10 is firmly attached to the plate 34 as the screw 56 is threaded into the hole 52, as shown in FIGURE 3. Preferably, the peripheral lower edge 11 of the base 10 is in engagement with the surface 48 when the inclined wall surfaces 20 and 22 are in firm engagement with the respective engagement surfaces 38 and 42.

For aesthetic reasons, the head 58 of the screw 56 is disposed within the recess 30 of the base 10, as shown in FIGURE 3.

From the foregoing description and drawings it is to be understood that the base 10 is thus securely attached to the surface 48 and the attachment means is substantially obscure within the base 10.

Figure 4:
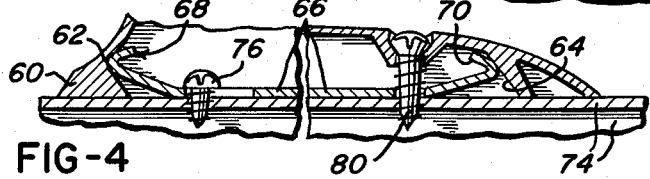
FIGURE 4 is a side sectional view, similar to FIGURE 3, showing a modification in the support structure and attachment means of this invention.

FIGURE 4 shows a modification of this invention in which a base 60 has an abutment portion 62 and an abutment portion 64, the abutment portions 62 and 64 being at opposite parts of the base 60. The abutment portion 62 is preferably, recessed, as shown, while the abutment portion 64 is, preferably, inclined, as shown.

A plate or bracket 66 has an abutment portion 68 at one end thereof and an abutment portion 70 at the other end thereof. The bracket 66 is secured to a support element 74 by means of a screw 76. The base 60 is secured to the bracket 66 and to the element 74 by means of a screw 80. The abutment portion 68 of the bracket 66 engages the abutment portion 62 of the base 60 as the left hand portion of the base 60 is "hooked over" the abutment portion 68 of the bracket 66. As the screw 80 is threaded into the element 74, cam action between the abutment portions 64 and 70 firmly draws the base 60 into secure attachment to the bracket 66 and to the element 74.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. Structure for attachment to a support member comprising:
   a bracket attachable to a portion of a support member, the bracket having a first engagement surface, the first engagement surface forming an acute angle with a portion of a support member to which the bracket is adapted to be attached, the bracket also having a second engagement surface, the second engagement surface forming an obtuse angle with a portion of a support member to which the bracket is adapted to be attached.
   a base provided with an engagement portion positionable within the acute angle formed between the first engagement surface of the bracket and a support member to which the bracket is attached, the base also having a wall, the wall being engageable with the second engagement surface of the bracket when the first engagement surface of the bracket is engaged by said engagement portion of the base,
   means for attaching the base to the bracket and to a support member, said means urging the base toward the bracket so that the wall of the base is urged into engagement with the second engagement surface of the bracket.

2. Support structure for attachment to a support element comprising:
   a base provided with a cavity therein and an engagement edge,
   a plurality of internal wall surfaces within the cavity, both of the wall surfaces being inclined in the same general direction with respect to the engagement edge, a bracket having a size to fit within the cavity of the base,
   means for attaching the bracket to a support element, the bracket having a pair of engagement portions, the engagement portions of the bracket being engaged by the wall surfaces of the base as the bracket is disposed within the cavity,
   means for attaching the base to the bracket and to a support element, said means urging the wall surfaces of the base into engagement with the engagement portions of the bracket.

3. Support structure for securing a mirror or other device to a support element comprising:
   a base having a cavity, there being a plurality of spaced-apart engagement portions within the cavity, one of the engagement portions being recessed and one of the engagement portions being inclined,
   a bracket, the bracket being disposible within the cavity of the base, the bracket being provided with a plurality of abutment portions, there being an abutment portion engageable with each of the engagement portions of the base,
   and means for securing the base to the bracket and to a support element, said means urging the inclined engagement portion of the base into engagement with one of the abutment portions of the bracket thus urging the recessed engagement portion of the base into engagement with another of the abutment portions of the bracket.

4. A base assembly for attachment to a portion of an automobile or the like comprising:
   an elongate plate,
   means for attaching the plate to portion of an automobile or the like, the plate having an inclined surface at each end thereof, both of the surfaces being inclined in the same general direction with respect to the plate,
   an elongate base having an engagement edge, the base having a cavity therein which is open at the engagement edge and which is adapted to receive the plate, the cavity having a pair of inclined walls therewithin, there being an inclined wall at each of the opposite portions of the cavity, each of the inclined walls being inclined in the same general direction with respect to the engagement edge of the base, the base fitting over the plate with one wall of the cavity engaging one surface of the plate and the other wall of the cavity engaging the opposite surface of the plate,
   means for forcing each inclined wall of the cavity against its respective inclined surface of the plate and for securing the base with respect to the plate.

5. Support structure for attachment to an attachment element comprising:
   a base provided with a plurality of substantially parallel inclined walls,
   a connection plate provided with a plurality of inclined engagement surfaces, there being one inclined engagement surface for each of the inclined walls of the base, each of the inclined walls of the base being engageable by one of the inclined engagement surfaces of the plate,
   means for attachment of the base to the plate and to an attachment element, said means urging the inclined walls of the base into engagement with the inclined engagement surfaces of the plate, said means also securing the position of the base with respect to the plate and with respect to an attachment element.

6. Structure for attachment to a support member comprising:
   a bracket provided with a first inclined engagement surface and a second inclined engagement surface, the bracket being attachable to a portion of a support member with the first inclined engagement surface forming an acute angle with a portion of a support member to which the bracket is adapted to be attached and with the second inclined engagement surface forming an obtuse angle with respect to a portion of a support member to which the bracket is adapted to be attached, a base provided with a cavity therein, there being an abutment wall within the cavity which is engageable with the first inclined engagement surface of the bracket, there being an abutment wall within the cavity which is engageable with the second inclined engagement surface of the bracket, means for securing the base to the bracket and the bracket to a support member, said means urging said abutment walls into engagement with said inclined engagement surfaces.

7. Structure for attachment to a support member comprising:

a bracket provided with a plurality of engagement surfaces, there being a first engagement surface and a second engagement surface, the bracket being attachable to a portion of a support member with the first engagement surface forming an acute angle with a portion of a support member to which the bracket is adapted to be attached and with the second engagement surface forming an obtuse angle with respect to a portion of a support member to which the bracket is adapted to be attached, a base provided with a plurality of engagement walls, there being a first engagement wall which is engageable with the first engagement surface of the bracket, there being a second engagement wall which is engageable with the second engagement surface of the bracket, means for securing the base to the bracket and the bracket to a support member, said means urging said second engagement wall of the base into engagement with the second engagement surface of the bracket thus urging the first engagement wall of the base into engagement with the first engagement surface of the bracket.

8. Support structure for a mirror or the like for attachment thereof to a support portion of an automobile or the like comprising:

a base provided with a cavity, the base being provided with an engagement edge surface encompassing the cavity and adapted to engage a support portion of the automobile or the like, a pair of inclined walls within the cavity, the walls being spaced apart, both of the inclined walls being angularly disposed in the same general direction with respect to the edge surface of the base, a bracket provided with a pair of holes therethrough, there being a first hole and a second hole, the first hole of the bracket being adapted to receive a screw threaded into a support portion of the automobile or the like, the bracket also being provided with a pair of spaced apart abutment portions, each of the abutment portions having an abutment surface, both of the abutment surfaces being inclined in the same general direction with respect to the bracket, the bracket fitting within the cavity of the base with the inclined walls of the cavity engaging the abutment surfaces of the bracket, the base having a hole therein leading to the cavity and in alignment with the second hole of the bracket when the bracket is within the cavity, the hole of the base and the second hole of the bracket being adapted to receive a screw which is threaded into a support portion of an automobile or the like, threading action of the screw into a support portion causing increasing forces between each of said inclined walls and the abutment surface which is in engagement therewith so that the base is securely attached to the bracket and to a support portion of an automobile or the like.

9. Structure for mounting upon a support member comprising:

a bracket attachable to a support member, the bracket having a first hole therethrough for receiving a screw attachable to a support member, the bracket having a plurality of angularly inclined engagement surfaces, one of the engagement surfaces of the bracket being a first angularly inclined engagement surface and forming an acute angle with a portion of a support member to which the bracket is adapted to be attached, one of the angularly inclined engagement surfaces of the bracket being a second engagement surface and forming an obtuse angle with a portion of a support member to which the bracket is adapted to be attached, the second angularly inclined engagement surface being generally parallel with the first angularly inclined surface, a base provided with a first portion, the first portion of the base being disposed within said acute angle intermediate said first angularly inclined engagement surface of the bracket and a support member to which the bracket is adapted to be attached, said first portion of the base being engageable with said first angularly inclined engagement surface of the bracket, the base having an inclined wall engageable with the second angularly inclined engagement surface of the bracket, there being a hole in the base and in the bracket adjacent the second angularly inclined engagement surface of the bracket, the holes being aligned so that a screw may pass therethrough for attachment to a support member, the screw urging the inclined wall of the base into engagement with the second angularly inclined engagement surface of the bracket and thus urging said first portion of the base into engagement with the first angularly inclined engagement surface.

10. Structure for support by a support member comprising:

a bracket attachable to a support member, the bracket being provided with a body portion having a plurality of spaced-apart inclined engagement surfaces being inclined in the same general direction, a base provided with a recess therein, the recess being adapted to enclose the bracket within the base, the base having a plurality of abutment portions which engage the inclined engagement surfaces of the bracket, one of the inclined engagement surfaces of the bracket being a first surface and facing a support member and forming an acute angle with respect to the body portion of the bracket so that when an abutment portion of the base is in engagement with the first surface of the body portion of the bracket a portion of the base is within said acute angle and intermediate said first surface of the bracket and a support member, one of the inclined engagement surfaces of the bracket being a second surface and facing away from a support member to which the bracket is attached and forming an obtuse angle with respect to the body portion of the bracket, the second surface of the bracket being engaged by one of the abutment portions of the base, and means adjacent the second surface of the bracket for attaching the base to the bracket and to a support member, said means urging each of the abutment portions of the base toward its respective engagement surface of the bracket and thus securing the base to the bracket and to a support member.

11. Structure for attachment to a support member comprising:

a bracket attachable to a support member, the bracket being provided with a plurality of engagement surfaces, there being a first inclined engagement surface and a second inclined engagement surface, both of the inclined engagement surfaces being inclined in the same general direction, the first inclined engagement surface facing the support member and the second inclined engagement surface facing away from a support member, a base provided with a plurality of abutment portions, there being a first abutment portion of the base which is engageable with the first inclined engagement surface of the bracket as the abutment portion of the base is disposed between the engagement surface of the bracket and a support member, there being a second abutment portion of the base which is engageable with the second engagement surface of the bracket, means engaging the base and extending through the base and through the bracket and into a support member for securing the base to the bracket and to a support member, said means being adjacent the second inclined engagement surface of the bracket and drawing the base toward the bracket and toward a support member and forcing the second abutment portion of the base toward the second inclined engagement surface of the bracket and causing the first abutment portion of the base to be urged toward the first inclined engagement surface of the bracket.

References Cited by the Examiner

UNITED STATES PATENTS

| | | | |
|---|---|---|---|
| 2,138,647 | 11/38 | Schofield | 248—223 |
| 2,195,013 | 3/40 | Rastetter | 248—223 |
| 2,505,588 | 4/50 | Smith | 248—223 X |
| 2,658,705 | 11/53 | Whitman | 248—223 X |
| 2,701,113 | 2/55 | Koonter | 248—205 |
| 3,036,803 | 5/62 | Fiebelkorn | 248—223 |

CLAUDE A. LE ROY, *Primary Examiner.*